(12) United States Patent
Jubb et al.

(10) Patent No.: US 12,515,181 B2
(45) Date of Patent: Jan. 6, 2026

(54) ACOUSTIC MIXERS

(71) Applicant: THE FALCON PROJECT LTD, Manchester (GB)

(72) Inventors: Daniel Jubb, Manchester (GB); Mark Price, Manchester (GB); David Price, Manchester (GB); Kenneth Lewtas, Oxfordshire (GB)

(73) Assignee: The Falcon Project Ltd., Manchester (GB)

( * ) Notice: Subject to any disclaimer, the term of this patent is extended or adjusted under 35 U.S.C. 154(b) by 1221 days.

(21) Appl. No.: 16/754,817

(22) PCT Filed: Oct. 8, 2018

(86) PCT No.: PCT/EP2018/077300
§ 371 (c)(1),
(2) Date: Apr. 9, 2020

(87) PCT Pub. No.: WO2019/076661
PCT Pub. Date: Apr. 25, 2019

(65) Prior Publication Data
US 2020/0238238 A1     Jul. 30, 2020

(30) Foreign Application Priority Data
Oct. 9, 2017    (GB) ..................................... 1716490

(51) Int. Cl.
*B01F 31/86*     (2022.01)
*B01F 25/83*     (2022.01)
(Continued)

(52) U.S. Cl.
CPC .............. *B01F 31/86* (2022.01); *B01F 25/83* (2022.01); *B01F 25/90* (2022.01); *B01F 31/57* (2022.01);
(Continued)

(58) Field of Classification Search
None
See application file for complete search history.

(56) References Cited

U.S. PATENT DOCUMENTS

| 4,438,075 | A | 3/1984 | Von Branchel et al. |
| 6,399,029 | B1 * | 6/2002 | Porteous ................ G01G 11/08 |
| | | | 73/863.52 |

(Continued)

FOREIGN PATENT DOCUMENTS

| CN | 205084633 U | 3/2016 |
| JP | S61259747 A | 11/1986 |

(Continued)

OTHER PUBLICATIONS

International Search Report and Written Opinion, Application No. PCT/EP2018/077300 dated Feb. 12, 2019.

(Continued)

*Primary Examiner* — Aileen B Felton
(74) *Attorney, Agent, or Firm* — The Dobrusin Law Firm, P.C.

(57) ABSTRACT

A processing vessel (1) provided with a material inlet (2, 3, 4, 5) and a processed material outlet (25) wherein the material flows continuously through the vessel which is split into a series of zones (6, 7, 8) through which the material passes wherein the zones are shielded from each other by controlling the rate at which the material flows and an increasing level of vacuum is applied inconsecutive zones and the system is provided with acoustic energy which imparts energy to the process material by virtue of the contact between the zone dividers and the process material and processing material in such a vessel.

9 Claims, 2 Drawing Sheets

Figure 1:
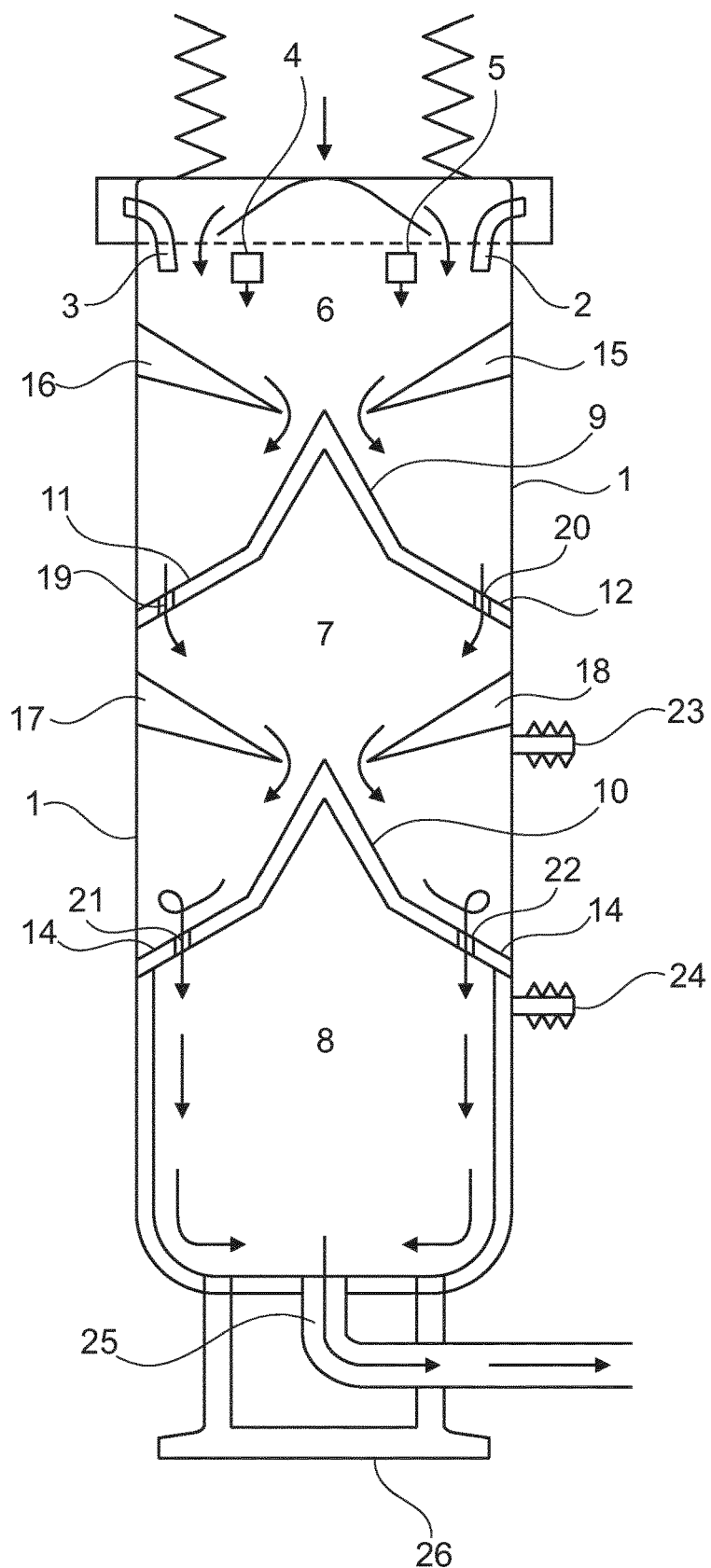

(51) Int. Cl.
  *B01F 25/90* (2022.01)
  *B01F 31/00* (2022.01)
  *B01F 33/70* (2022.01)
  *B01F 35/221* (2022.01)
  *B01F 35/90* (2022.01)
  *B01F 35/93* (2022.01)
  *B01F 101/00* (2022.01)
  *C06B 21/00* (2006.01)

(52) U.S. Cl.
  CPC .......... *B01F 33/70* (2022.01); *B01F 35/2215* (2022.01); *B01F 35/93* (2022.01); *C06B 21/0008* (2013.01); *B01F 2035/99* (2022.01); *B01F 2101/503* (2022.01)

(56) References Cited

U.S. PATENT DOCUMENTS

| | | | |
|---|---|---|---|
| 2013/0329514 A1* | 12/2013 | Farrar | ................ B01F 31/57 366/111 |
| 2015/0146496 A1 | 5/2015 | Lucon et al. | |
| 2017/0348667 A1 | 12/2017 | Farrar et al. | |

FOREIGN PATENT DOCUMENTS

| | | |
|---|---|---|
| WO | 2004/002614 A1 | 1/2004 |
| WO | 2009/027193 A1 | 3/2009 |
| WO | 2017/064102 A1 | 4/2017 |

OTHER PUBLICATIONS

UK Search Report dated Apr. 9, 2018, Application No. GB1716490.6.

India First Examination Report dated Mar. 22, 2022, Application No. 202017015514.

* cited by examiner

ACOUSTIC MIXERS

The present invention relates to the continuous processing of materials particularly to the continuous mixing of materials in which the energy required for the processing of the materials is supplied at least in part by acoustic agitation. The processing with which this invention is concerned may comprise mixing, coating, drying, grinding/abrading chemically reacting materials, including polymerisation and cross-linking, as well as other processing systems and is preferably continuous processing.

United States Patent Publication 2013/0329514 describes a mechanical system that continuously processes a combination of materials. The system employs an acoustic agitator coupled to a continuous process vessel which comprises an inlet and an outlet and a plurality of plates that direct the flow of the process ingredient through the process vessel. The plates are capable of transferring acoustic energy generated by the acoustic agitator into the process ingredient. The system of United States Patent 2013/0329514 can provide a vacuum, within the process vessel to create a full or partial vacuum in the process vessel to reduce or eliminate drag as materials are introduced into the process vessel by sprayers.

Such systems are commercially available from the Resodyn Corporation and are known as Resonance Acoustic Mixers (RAM) and Continuous Acoustic Mixers (CAM). The systems continuously fluidize, mix, coat, dry, combine, chemically react and/or segregate materials utilizing acoustic agitation technology.

The application of acoustic agitation technology and continuous processing of materials provides a method to combine, react, mix, dry, and/or coat materials uniformly, while reducing the space needed for equipment to carry out these processes and increasing the efficiency of the process and in relation to the production of certain materials such as energetic materials increasing the safety of the operation. More particular, an acoustic agitator coupled to a continuous process vessel can produce low frequency acoustic energy that mixes materials in a continuous process vessel in a uniform and even fashion. This continuous processing system can also be equipped with ancillary features, such as temperature sensors; vacuum pressure; heating and cooling mechanisms; filters; sensors to detect the degree of mixing and sieves to optimize the continuous process vessel's ability to mix, combine, dry, coat, segregate, and react materials.

Whilst these systems are effective mixers there remains a need for systems that produce more homogenous products more efficiently and in particular result in products that are free or substantially free from voids and or bubbles and the present invention addresses these issues This invention also ensures the vacuum within the vessel is maintained and that different levels of vacuum can be applied in different stages of the process.

The present invention therefore provides a continuous processing system comprising a processing vessel provided with material inlets and a processed material outlet wherein the material flows through the vessel and the vessel comprises a series of dividers which split the process vessel into a series of zones through which the material passes wherein during operation the zones are shielded from each other, by controlling the rate at which the material can flow past the dividers and an increasing level of vacuum is applied in consecutive zones and wherein the system is provided with acoustic energy which imparts energy to the process material by virtue of the contact between the dividers and the process material.

The term shielding is used herein to describe the provision of a sufficient barrier between the zones that the differential pressure (measuring vacuum) between zones be maintained. The shield is provided by sufficient process material lying over the holes despite the material continuing to flow through the holes. The shield may amount to a hermetic seal, an essentially hermetic seal or an intermittently hermetic seal. The requirement is that the differential pressure is maintained during processing at most or all times.

The system of the present invention is constructed so that the process material is introduced at the top of the process vessel and passes downwards though the process vessel preferably under gravity through the series of zones and is taken off towards the bottom of the process vessel through the process material outlet. The dividers are provided with holes to allow passage of the material from one section to the one below and the flow of the process material down the process vessel is controlled by the dividers such that it flows through the holes provided in the dividers whilst at the same time the dividers are shaped so that sufficient process material lies over and in the holes in the dividers as it passes through them to ensure that there is a shield between the zones of the process vessel, so that the zones are shielded from each other in a way that ensures that a differential pressure between the zones is maintained during processing. Accordingly the dividers may be shaped (either fixed or variable) to direct the material flow and if necessary their temperature may be controlled so that the flow of the process material is such that a pool of process material is formed over the holes in the dividers allowing process material to flow through the holes whilst maintaining a pool of material over the hole formed from the flowing material thus forming a seal or partial seal between the sections. The size of the hole or holes in the divider can range from a few tenths of an inch to several inches and may be variable or consist of a variable number of multiple holes. Furthermore, the number, size and shape of the holes may be chosen to suit the material being processed.

The preferred design will depend upon the nature of the material that is being processed and the nature of the processing. For example a different design may be required if the processing involves a chemical reaction between two liquids or slurries involving a change in the viscosity of the process material as it passes through the process vessel than if the processing involves the mixing of two or more solids. However in a preferred system the dividers which extend across the entire width of the process vessel are conical with a downwardly extending skirt which extends to the interior wall of the process vessel and the holes for flow of material through the dividers are provided within the skirt. In this way process material can flow down the conical section of the divider and onto the skirt where it forms a pool of material over the hole or holes whilst also flowing through the hole or holes. The system may also be provided with guide plates and or baffles within the various zones of the process vessel which direct the process material onto the conical surface of the dividers.

In a preferred embodiment the process vessel is cylindrical and the process material is introduced continuously from an annular inlet located at the top of the process vessel.

The dividers and any plates that are present in the zones may be hollow to allow for a heating or cooling fluid to pass through the dividers and plates so as to provide a means of controlling the viscosity of the process material as it passes over the plates and the dividers so that it forms the pool of material over the holes in the dividers whilst continuing to flow therethrough. The dividers and/or any plates that are present may be provided with temperature sensors to enable the temperature to be detected and changed if required for example to control the viscosity of the process material.

The degree of vacuum that is applied in the various zones will depend upon the materials that are being processed and the viscosity of the material at the point where it moves from one zone to the next zone. However, and just by way of example there may be three zones in a process vessel. The first zone being the zone in which the process material is introduced and which may be at atmospheric pressure. The second zone beyond a first divider may have an applied vacuum so that the pressure in the zone is about 50% of atmospheric and the third zone beyond a second divider may have an applied vacuum so that the pressure in the zone is about 25% of atmospheric pressure and the material may be taken off from the vessel into an article to be filled under an increased vacuum. The material may be withdrawn from the process vessel under full vacuum to facilitate the withdrawal of the process material.

In one aspect, this invention relates to a system for continuously processing a combination of materials. The system includes an acoustic agitator connected to a continuous process vessel. The continuous process vessel includes a first inlet configured for introducing at least one process ingredient; a plurality of dividers dividing the process vessels in a series of zones and configured for directing a flow of the at least one process ingredient through the zones of the continuous process vessel and capable of transferring acoustic energy generated by the acoustic agitator into the at least one process ingredient; and an outlet for discharging a product wherein the zones have increasing levels of vacuum applied therein and are shielded from each other to allow the differential pressure between the zones to be maintained.

The first inlet is positioned at the top of the process vessel and the process vessel is configured with multiple zones, one or more of the zones preferably include at least one or a plurality of plates. The plates can be arranged at different angles within the zone of the process vessel and may consist of multiple angles or curves and may be variable. The plate angle can range from 1 degree to 75 degrees. The surface of the plurality of plates can have a plurality of openings to serve as a sieve. The system can further include a baffle coupled to or formed integrally with at least one of the plurality of plates.

A grinding media can be disposed within the process vessel between a pair of dividers. In some embodiments, a means for controlling the temperature of the dividers and optionally the plurality of plates can be disposed within the process vessel. The system can include a fluid pathway for carrying coolant to cool the dividers and/or plates. In other embodiments, the system can include a fluid pathway for carrying a heated fluid to heat the dividers and/or the plates. In still other embodiments, the system can include a resistive heating element. The process vessel can include a cavity positioned between an inner wall and an outer wall of the process vessel. The cavity can further house a cooling and/or heating means to control the temperature of the process vessel. Temperature sensors can be provided to monitor temperature and effect changes as may be required.

In some embodiments, the system can include a device for the introduction of the materials which, for example, may be a drip feeder, a solid feed, a spray nozzle or other such device to introduce the process materials into the process vessel. The system can include multiple insertion devices, e.g. spray nozzles and a plurality of ports to extract materials from or inject materials into the process vessel. In another embodiment the process material can be introduced into the process vessel as a drip feed.

In a further embodiment the invention provides a process for processing materials wherein materials are fed and pass through a process vessel divided into a series of zones by dividers wherein the zones are shielded from each other during the process and progressively increasing vacuum is applied to consecutive zones in the process vessel and acoustic energy is applied to the process vessel wherein shielding is provided by material covering the holes whilst allowing passaging of the materials through the holes during the processing.

In a preferred embodiment the process vessel is vertical and the processing materials flow through the vessel under gravity and vacuum.

At least one process ingredient may be introduced into the process vessel from a solid feed or a spray nozzle. The method can further include injecting the at least one process ingredient from multiple spray nozzles and a plurality of ports coupled to the process vessel. In other embodiments, the method can include extruding the at least one process ingredient from a plurality of ports coupled to the process vessel. The method of this invention can include controlling the flow of the at least one process ingredient within a zone to the next zone of the process vessel by at least one or a plurality of plates located in the zones which direct the process material onto the dividers. The method can also include controlling the flow by adjusting the shape and/or size of the hole or holes in the dividers and/or by changing a plate angle of at least one of the plurality of plates within a zone. The number of holes can also be increased or decreased.

The method can include controlling the temperature of the process material by controlling the temperature of the dividers and/or any plates that may be employed. The method can include controlling the temperature of the process vessel. Temperature sensors may be provided on the plates and/or dividers and/or in the process vessel to determine when a temperature change may be required.

The continuous processing system of this invention operates at mechanical resonance that enables large vibrational amplitudes at low-frequencies, for example, in the range of between about 30 Hz to about 1 kHz. In a preferred embodiment, the system operates at about 60 Hz. These large amplitudes create a strong sinusoidal acoustic or vibrating field inside the continuous process vessel, which is translated to the process material and provides efficient and intense mixing and/or reacting. Additionally, the displacement of the dividers and any plates disposed within the continuous process vessel can impose large acceleration forces on the materials to increase the efficiency and intensity of the mixing and reacting. Low-frequency, high-intensity acoustic energy is used to create a shear field throughout substantially the entire continuous process vessel, which results in rapid fluidization, reaction and/or dispersion of materials. Operation at such high accelerations puts large mechanical stresses into the components of the process vessel, but, as the process vessel is oscillated at or near resonance, the operation of the device is efficient. Because of these features, the reliability of the equipment at extreme operating conditions is substantially improved and enables the technology to be scaled. Such systems are applicable to a wide variety of reactions and mixing applications.

Low frequency acoustic agitation (LFAA) differs from ultrasonic mixing in that the frequency of acoustic energy is orders of magnitude lower. Most ultrasonic (>20 kHz) energies are fully absorbed by the material immediately in front of the ultrasonic transducer. LFAA mixing utilizes acoustic energy, in some implementations nominally at 60 Hz (though at other frequency less than 1 kHz in other implementations), that fully penetrates substantially the entire contents of a process vessel. The acoustic energy produced by the LFAA can range from a few g's to hundreds of g's. Unlike impeller agitation, which mixes by inducing bulk flow with eddies generated at the impeller edges, the LFAA mixing occurs substantially uniformly throughout the mixing volume. Additional interactions with the vessel walls cause beneficial bulk flow. Sound or pressure waves radiating from the dividers and optionally the plates are attenuated, scattered, reflected, or propagated as they transmit through a non-homogeneous material. Attenuation creates an energy gradient which corresponds to a body force onto the material being mixed. This force induces macro flow in the material referred to as acoustic streaming. The acoustic streaming, along with the interaction between the material and the mixing vessel, results in the mixing of the material. Because the acoustic field forms throughout the process vessel there are low and in many cases no mixing dead zones and the shear may be distributed throughout the process vessel once the materials are fluidized (in the case of solids). The scattering and reflected waves also create body forces on sub-elements of the material with volumes of different density. Depending on the density ratio and material viscosity, these body forces can be significant or negligible in performing mixing. In some implementation, both the top and the bottom of each plate within a process vessel, impart acoustic energy on the material as it travels through each level of the vessel.

The division of the process vessel into zones shielded from each other with increasing levels of applied vacuum in consecutive zones has been found to reduce or eliminate the formation of voids or bubbles in the final product and aid uniform material dispersion.

The system and process of this invention can be used for a variety of processing operations. For example it may be used for mixing fluids and/or solids, it may be used for processing materials that react with each other and the dimensions of the process vessel, the dimensions of the dividers and/or plates can be selected according to the process that is to be implemented in the system. One particular process in which we have found the system of the invention to be particularly useful is in the preparation of polymer formulations such as those that are useful as polymer composites, adhesives, coatings and energetic materials.

The system has been found to be particularly useful in the rapid energy efficient production of homogenous dispersions of materials such as particulate materials in polymer systems whilst ensuring a low level of voids or bubbles in the dispersion. Examples are the production of energetic materials or composite propellants which require a dispersion of an active material such as an oxidiser within a polymeric binder, optionally in the presence of a plasticiser. Alternatively the energetic material may comprise a dispersion of an active material in a binder material together with a hydrocarbon resin or rosin such as the energetic materials described in PCT Publication WO 2017/064102.

The temperatures to be used in the process vessel will depend upon the operation to be performed in the process vessel however we have found that in the development of energetic materials such as those described in WO2017/064102 temperatures in the range 25-75° C. are particularly useful.

In a further embodiment of the invention quality control measures can be provided in the final zone of the vessel or at the outlet which can divert material away from product collection if any quality requirements are not met. For example, ultrasonic analysis or spectroscopy such as near infrared analysis of the product can be provided to detect any defects in the product and trigger the diversion of the material away from quality product collection.

The invention is illustrated by reference to the accompanying FIG. 1 which shows a vertical process vessel (1) provided with inlets for process materials (2), (3), (4) and (5). The process vessel is divided into three zones (6), (7) and (8) by cone shaped dividers (9) and (10) each of which are provided with a downwardly extending skirt (11), (12), (13) and (14). Plates (15) and (16) are provided in zone (6) to direct the process material onto divider (9) and plates (17) and (18) and provided in zone (7) to direct the material that passes through divider (9) onto the divider (10). The divider (9) is provided with holes (19) and (20) formed in skirt (11), (12) to allow passage of process material and divider (10) is provided with holes (21) and (22) formed in skirt (13) and (14) to allow passage of the process material.

Vacuum is applied to zone (17) by means of the exhaust (23) and a greater vacuum is applied to zone (8) by means of exhaust (24). The processed material exists the vessel (1) through the outlet (25).

An acoustic agitator (not shown) can be attached to the top or base of the process vessel (26). The arrows in the Figures illustrate schematically the passage of the process material through the process vessel. Although not illustrated the passage is controlled so that although there is continuous flow of process material there is sufficient process material over holes (19), (20), (21) and (22) to maintain a shield between zones (6) and (7) and between zones (7) and (8) so that the differential in the applied vacuum between the zones is maintained.

Figure 2:
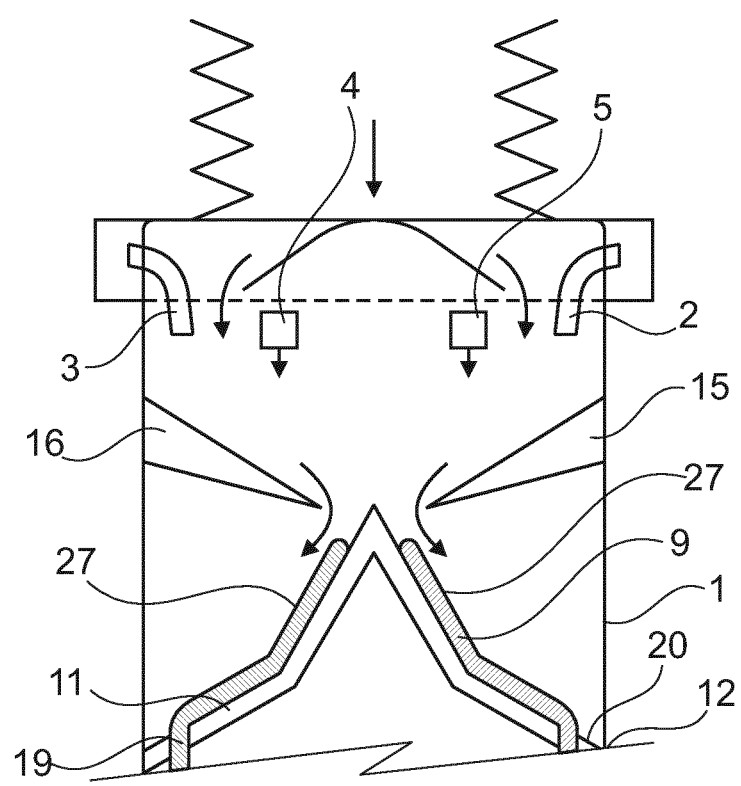

FIG. 2 shows how the shield is accomplished in relation to divider (9) between zones (6) and (7) by the process material (27) being over the holes (19) and (20).

What is claimed is:

1. A process for processing materials wherein materials are fed to and pass through a process vessel divided into a series of zones by dividers;
   wherein the dividers include one or more holes for the passage of the materials through the vessel;
   wherein each zone in the series of zones includes a shield that allows for differential pressure to be applied to the each zone;
   wherein the shield includes sufficient process materials covering the one or more holes, whilst also allowing for passage of the process materials through the one or more holes during processing, in order to form a hermetic seal or an intermittent hermetic seal; and
   wherein progressively increasing vacuum is applied to consecutive zones in the series of zones in the process vessel; and
   wherein acoustic energy is applied to the process vessel.

2. A process according to claim 1 in which the process vessel is vertical, and the processing materials flow through the vessel under gravity and vacuum.

3. A process according to claim 1 comprising injecting at least one process material of the process materials from multiple spray nozzles, a plurality of ports coupled to the process vessel, or a combination thereof.

4. A process according to claim 1 wherein at least one zone includes at least one plate which directs at least one process material of the process materials onto the dividers.

5. A process according to claim 1 in which the temperature of the process material is controlled by controlling the temperature of the dividers, any plates, or a combination thereof that may be employed.

6. A process according to claim 1 in which the acoustic energy is supplied in a range of between 30 Hz to 1 KHz.

7. A process according to claim 1 comprising the preparation of polymer formulations such as polymer composites, adhesives, coatings, and energetic materials.

8. A process according to claim 1 comprising production of energetic materials or composite propellants by dispersion of an active material, such as an oxidiser, within a polymeric binder, optionally in the presence of a plasticiser or resin.

9. A process according to claim 1 in which the quality of the processed material is monitored by quality control means.

* * * * *